(12) United States Patent
Hafner et al.

(10) Patent No.: US 7,928,693 B2
(45) Date of Patent: Apr. 19, 2011

(54) PLUGIN HYBRID ELECTRIC VEHICLE WITH V2G OPTIMIZATION SYSTEM

(75) Inventors: James Lee Hafner, San Jose, CA (US); Allan James Schurr, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 376 days.

(21) Appl. No.: 12/048,183

(22) Filed: Mar. 13, 2008

(65) Prior Publication Data
US 2009/0229900 A1    Sep. 17, 2009

(51) Int. Cl.
*H02J 7/00*    (2006.01)
(52) U.S. Cl. .............. 320/132; 180/65.29; 320/109
(58) Field of Classification Search .......... 320/109, 320/132
See application file for complete search history.

(56) References Cited

U.S. PATENT DOCUMENTS

| | | | |
|---|---|---|---|
| 5,642,270 A * | 6/1997 | Green et al. .............. 363/17 |
| 6,434,465 B2 | 8/2002 | Schmitt et al. | |
| 6,487,477 B1 | 11/2002 | Woestman et al. | |
| 7,013,205 B1 | 3/2006 | Hafner et al. | |
| 7,216,729 B2 | 5/2007 | Syed et al. | |
| 7,309,966 B2 * | 12/2007 | Wobben ............. 318/139 |
| 7,698,078 B2 * | 4/2010 | Kelty et al. ............. 702/63 |
| 2004/0062059 A1 | 4/2004 | Cheng et al. | |
| 2007/0068714 A1 | 3/2007 | Bender | |
| 2007/0282495 A1 | 12/2007 | Kempton et al. | |
| 2008/0039989 A1 * | 2/2008 | Pollack et al. .......... 701/22 |
| 2008/0312782 A1 * | 12/2008 | Berdichevsky et al. ...... 701/22 |
| 2009/0192655 A1 * | 7/2009 | Ichikawa et al. ........ 700/291 |

OTHER PUBLICATIONS

O'Keefe et al.,NREL/CP-540-40376 Conference Paper Nov. 2006 Dynamic Programming Applied to Investigate Energy Management Strategies for a Plug-in HEV.
Gonder et al.,NREL/CP-540-40970 2007 SAE World Congress Apr. 16-19, 2007 Detroit Michigan Energy Management Strategies for Plug-in Hybrid Electric Vehicles.
Boujelelben et al., IEEE 2006 0-7803-9794-0/06 Evaluation and optimization of a hybrid urban Microbus.
S. De Breucker et al., Dep. Electrical Engineering Research Group Electa Kasteelpark Arenberg 10 Belgium Grid Power Quality Improvements Using Grid-Coupled Hybrid Electric Vehicles PEMD 2006.
Zhonghao et al., Hunan University China College of Electrical Information Engineering Research on Modeling and Simulation of Hybrid Electric Vehicle Energy Control Systems.
Cikanek et al., Ford Research Laboratory Proceedings of the American Control Conference San Diego Jun. 1999 Control System and Dynamic Model Validation for a Parallel Hybrid Electric Vehicle.
Markel et al., Advanced Automotive Battery Conference May 19, 2006 Plug-in Hybrid Electric Vehicle Energy Storage System Design.
Piccolo et al., Universita' Degli Studi—Salerno [Abstract only] Fuzzy Logic Based Optimal Power Flow Management in Parallel Hybrid Electrical Vehicles.
Short et al., NREL/TP-620-39729 Apr. 2006 A preliminary Assessment of Plug-in Hybrid Electric Vehicles on Wind Energy Markets.

* cited by examiner

*Primary Examiner* — Edward Tso
*Assistant Examiner* — Ramy Ramadan
(74) *Attorney, Agent, or Firm* — Donald Wenskay; Mohammed Kashef

(57) ABSTRACT

In one aspect of the present invention, a vehicle comprises: a consumable fuel powered engine, a battery and an electric motor powered by the battery. The battery is rechargeable both from an external electric power source (such as an electric power grid) and from the consumable fuel powered engine. A computer receives data as inputs and providing outputs, wherein the input data includes an expected state of the electric power source at a time when the vehicle is expected to be coupled to the electric power source. The outputs include control signals to control the state of charge of the battery during the time the vehicle is expected to be coupled to the electric power source.

18 Claims, 6 Drawing Sheets

PLUGIN HYBRID ELECTRIC VEHICLE WITH V2G OPTIMIZATION SYSTEM

BACKGROUND OF THE INVENTION

The present invention relates generally to hybrid electric vehicles and, more specifically, to systems for optimizing the operation of hybrid electric vehicles having a connection to an electrical grid.

Hybrid vehicles typically use a combination of consumable fuel (such as gasoline, natural gas, hydrogen, and others) and battery-stored electricity. As hybrids become a major segment of the automobile market, they are displacing electric-only vehicles, as well as conventional vehicles that are powered solely by internal combustion engines or other consumable fuel powered means. The electric power system of an electric-only vehicle is open, in the sense that such a vehicle lacks an onboard means to recharge the battery and therefore must be recharged from an external source. By contrast, the electrical power system of a hybrid vehicle is closed, in the sense that such a vehicle is not recharged from external sources but is instead recharged from an onboard consumable fuel powered means, which may be an internal combustion engine (powered by gasoline, diesel, ethanol, natural gas, hydrogen or another combustible fuel) or which may be a hydrogen fuel cell or other alternative consumable-fuel-based power unit. Passive recharging systems, such as regenerative braking systems, may also be used in hybrid vehicles.

Electric-only vehicles generally employ an open system in which batteries are recharged from an external electric power source, which may be conventional house current, a publicly accessible recharging facility, or any external source of electric power compatible with the vehicle's recharging system. Recharging such an electric-only vehicle from conventional house current alone may limit the useful range of the vehicle to no more than the distance that can be traveled on a single battery charge. External electric power sources for recharging electric-only vehicles could be provided at publicly accessible facilities; however, such facilities have, to date, not become widely available.

Hybrid vehicles employ a closed system in which the vehicle power system incorporates both a battery powered electric motor and a consumable fuel powered means from which the battery may be recharged. Power may be provided to the vehicle drive system by the electric motor and/or the consumable fuel powered means. Hybrid vehicles can refuel using consumable fuels, including but not limited to, fuels which may be available from filling stations, without regard to availability of an external electric power source suitable for recharging. Access to an external electric power source is not required for recharging a hybrid vehicle, because a hybrid vehicle's batteries are recharged from the vehicle's onboard consumable fuel powered means.

Hybrid vehicles have a number of drawbacks including recharging from the vehicle's onboard consumable fuel powered means makes the cost of recharging directly proportional to the cost of consumable fuel. That problem does not present itself with electric-only vehicles, where batteries are recharged from an external electric power source. However, electric-only vehicles may be less practical than hybrid vehicles, since their range is limited when external electric power sources are unavailable for recharging along the route of travel.

The above-discussed problems with electric-only vehicles and with hybrid vehicles are addressed by a third type of vehicle, the plug-in hybrid electric vehicle (PHEV). PHEVs combine the ability of electric-only vehicles to recharge from an external electric power source with the ability of hybrid vehicles to recharge from the onboard consumable fuel powered means. A PHEV has the ability to recharge its batteries either from a source outside the vehicle (such as by way of an electric plug) or from an onboard means such a consumable fuel powered means.

PHEVs are complementary with the electric power grid as systems for managing energy and power. Recent research has suggested that there is economic benefit for the utilities, for the drivers (who are also electric grid users), and for society as a whole in using the PHEV as an extension of the grid, both as a power source and a power reservoir, a so-called Vehicle-to-Grid (V2G). The power grid has essentially no storage (other than its 2.2% capacity in pumped storage), so generation and transmission must be continuously managed to match fluctuating customer load. This is now accomplished primarily by turning large generators on and off, or by ramping them up and down, some on a minute-by-minute basis. In contrast, plug-in hybrid electric vehicles, in the aggregate, have a large amount of electrical storage capacity.

The high capital cost of large generators motivates high use (average 57% capacity factor). In contrast, most vehicles are designed to have large and frequent power fluctuations, since that is in the nature of roadway driving. Personal vehicles are cheap per unit of power and are utilized only 4% of the time for transportation, making them potentially available the remaining 96% of time for a secondary function. Thus, a bidirectional coupling of the hybrid vehicle to the grid with V2G could achieve benefits for both the electric power grid as well as the PHEV fleet. In particular, this may be accomplished by using the PHEV as an extension of the grid, both as a power source and as a power reservoir.

From the perspective of the hybrid vehicle fleet, grid coupling enables a lower energy cost, since, while charging, the cost of energy from the grid is normally less than the cost of energy from fuel in the vehicle. Also, the PHEV owner may receive monetary compensation by utility companies for the power fed back into the grid. Another benefit is a reduction in environmental pollution, since electric energy production is relatively environmentally friendly as compared to vehicles powered by internal combustion engines.

From the perspective of the grid, the fleet of PHEVs can act as a controllable load to smooth grid load. That is, by injecting electrical energy into the grid, the PHEV can be used as a reserve power unit to off set the loss of a power plant, as replacement for peak power units, as part of a micro grid or as a stand alone generator. During non-peak periods, the PHEV can be used by the grid for electrical storage. Both of these uses in tandem allow the utilities to load-balance demand and supply so as to better manage overall grid capabilities and utilization. This, in turn, reduces the requirements on the utilities to build power generation facilities to cope with peak demand. In a V2G system, the utilities would reimburse or otherwise provide an economic benefit to the driver for the use of the traction battery in the vehicle.

However, the current vision of V2G does not coordinate the numerous parameters necessary in order to optimize either the driver's direct economic benefit or the grid's direct utility function from the use of the traction battery or any other economic or social benefit. These parameters may include, for example, the state of the vehicle batteries at the time the vehicle is plugged into the grid, the cost of fuel relative to the cost of energy from the electric power grid, the driver's needs as various times, etc.

The complexity of addressing such problems is increased when one considers a broad definition of the notion of "benefit" for the driver, the grid, and society. For example, the driver's benefits could be financial—how much does the driver save on costs or even get reimbursement from the utilities for the V2G use of the vehicle. However, many drivers also value their "green benefit". Utilizing V2G techniques may enable drivers to reduce their carbon footprint or to obtain or trade carbon footprint credits.

The complexity of optimizing V2G systems is further increased by the fact that, in some embodiments, solutions change as the vehicle changes its position relative to available external electric power sources, which is something a vehicle necessarily does when it is put to its intended use of moving from place to place. Furthermore, to be viable, V2G systems must be especially cost-effective for the driver in order to engage his/her participation in the process.

As can be seen, there is a need for a way to optimize the operation of V2G PHEVs to maximize the benefits for both the driver, the utility companies operating the grid, and society as a whole. There is also a need to optimize a V2G system which takes into account the numerous relevant factors such as the state of the vehicle's batteries at the time it is plugged into the grid, the needs of the grid as any particular time, driving habits of the vehicle owner, carbon footprint, and others.

SUMMARY OF THE INVENTION

In one aspect of the invention, a vehicle comprises: a consumable fuel powered engine; a battery; an electric motor powered by the battery, the battery being rechargeable both from an external electric power source and from a recharging system onboard the vehicle; and a computer receiving data as inputs and providing outputs, wherein the input data includes an expected state of the electric power source at a predetermined time, and the outputs include control signals to control the state of charge of the battery during the predetermined time.

In another aspect of the invention, a system for optimizing energy consumption comprises: a vehicle having a battery-powered electric motor and a consumable fuel powered means, a battery powering the electric motor being rechargeable both from an external electric power source and from a recharging system onboard the vehicle; a computer receiving data and instructions as inputs and providing outputs; the data inputs describing a condition of the electric power source at a time when the vehicle is expected to be plugged into the electric power source; and the instruction inputs enabling the computer to determine an optimal state of electric charge of the battery at the time the vehicle is expected to be plugged into the electric power source based on the condition of the electric power source.

In a further aspect of the invention, a method of controlling the operation of a plug-in hybrid electric vehicle comprises: determining an expected condition of an electric power grid at a future time when the vehicle is expected to be coupled to the electric power grid; and controlling the charging and discharging of a battery in the vehicle based on the expected condition such that a desired state of charge of the battery will exist at the future time.

In an additional aspect of the invention, a method for supplying energy comprises: generating electricity in a stationary electric generating unit; supplying the electricity to a grid; connecting vehicles to the grid; during a first time period, supplying electricity from the grid to the vehicle; during a second time period, drawing electricity from the vehicle to the grid; and controlling the operation of the vehicle so that the vehicle has a surplus of stored electricity to supply to the grid during the first time period.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention generally provides a system for optimizing the operation of a Vehicle-to-Grid (V2G) Plugin Hybrid Electric Vehicle (PHEV). The disclosed system can plan routes and gas/electric power utilization en-route to provide an economic benefit to the PHEV owner as well as an operator of the electric power grid. Embodiments of the invention may consider expected needs of the grid (storage or source), and the benefits to the PHEV owner for his/her contribution to the V2G system, as well as expected needs of the driver at the next driving interval. Benefits can be in monetary terms or in other quantifiable metrics such as carbon footprint.

There have been efforts towards this kind of optimization with non-V2G PHEVs. For example, U.S. Pat. No. 7,013, 205, "System and Method for Minimizing Energy Consumption in Hybrid Vehicles", which is incorporated herein by reference, discloses a software system for reducing energy consumption and driver costs by utilizing the electric and gasoline power sources in a PHEV to optimal advantage. This system assumes that electricity from the grid to recharge the battery at a destination is cheaper than gas to power the vehicle under most conditions. The system disclosed in U.S. Pat. No. 7,013,205 is not a V2G system and uses the electrical grid solely as a source of power for the battery. It uses variables such as potential routes to destination, terrain, traffic conditions, driver habits, electric sources at destination, relative efficiency of each power plant under differing driving conditions, and other variables to determine best mix of electric and gas power plants for the actual driving experience. This system presumes that electricity from the grid costs less than gasoline to power the vehicle under most conditions. For example, under this assumption, it is beneficial for the driver to have completely (or nearly) drained the vehicle battery when the driver arrives at home or other location where external power is available to recharge the vehicle's battery.

A feature of the invention is to measure the use of the battery system over the course of a given trip so that the electric/gas trade-off is optimized. For example, it may be better to use gas earlier in the trip if there is terrain later on the route that can utilize the electrical power to better efficiency and effect. Regardless of the electric/gas trade-off during the course of a driving trip, the expectation is that the traction battery in the car is mostly discharged when the vehicle is plugged into the grid and as such is simply a direct consumer of power from the grid.

Figure 1:
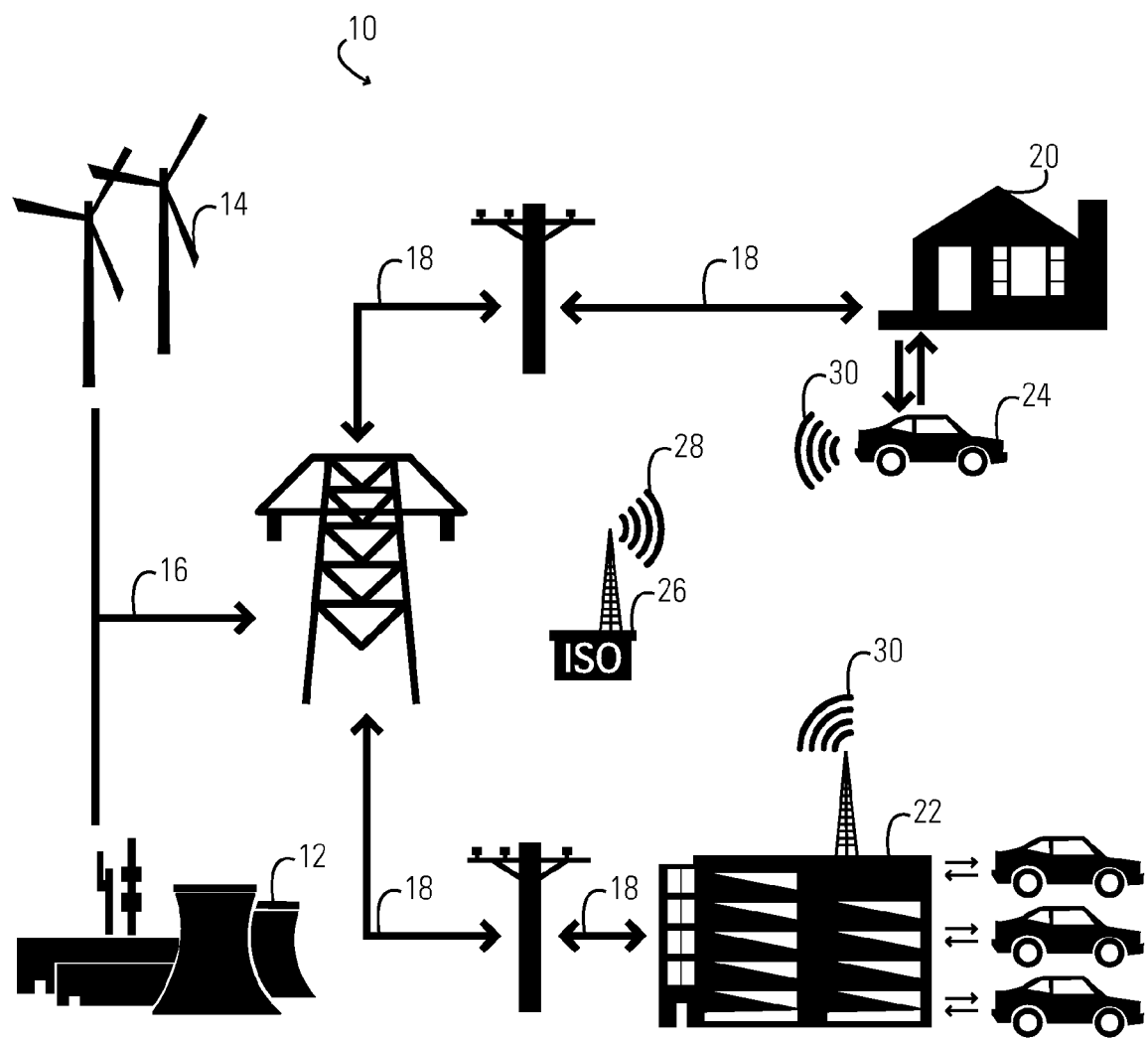
FIG. 1 is a schematic diagram of a V2G optimizing system for PHEVs according to an embodiment of the present invention.

The invention performs optimization based on numerous parameters of a V2G system. FIG. 1 shows a schematic diagram of a vehicle-to-grid (V2G) optimizing system 10 for PHEVs according to an embodiment of the invention. The basic concept of V2G power is that, while parked, the PHEV can draw power from, or provide power to, an electric power grid. The system 10 includes electric power generators such as those fueled by fossil fuel and nuclear power 12, and may also include renewable energy sources 14 such as wind, solar and others.

The electrical power generated by the power generators 12 and 14 is transmitted through transmission lines 16 and through a grid 18 of electrical transmission lines to electricity users. The electricity users may include residential users 20 and commercial users 22, each having the ability connect PHEVs 24 into the grid 18. Electricity may flow out of the grid 18 or back to the grid 18 from PHEVs 24, which is indicated by lines with two arrows.

A grid operator 26, such as an Independent System Operator (ISO) may send communication signals 28 to the electricity users 20 and 22. Additional communication signals 30 back to the grid operator 26 may also be generated by the residential site 20 and the commercial site 22, as described in more detail below. These communication signals 28 and 30 may be sent through a broadcast radio signal, a cell phone network, a direct Internet connection, a power line carrier or other communication means. In any case, during periods of peak power demand, the grid operator 26 may send signals 28 containing requests for power to a number of PHEVs 24. Also, during periods of low power demand, the grid operator 26 may send signals 28 containing requests to store power in a number of PHEVs 24. The signals 28 may go directly to each individual vehicle 24, as shown in the residential 20 location, or to the office of a fleet operator at a commercial 22 location, which may control a number of vehicles 24 in a single parking lot. In other embodiments, the signal 28 may be sent to a third-party aggregator of dispersed individual vehicles' power (not shown).

When the PHEV 24 is operating, it may modify its operation to optimize various factors using information such as the expected needs of the grid 18 when the PHEV 24 is parked. For example, if the PHEV 24 knows that the grid will need additional electrical power during the next time that the PHEV will be parked, the PHEV 24 may modify its operation so that it will be substantially charged when it is parked. Thus, it will have available energy when needed by the grid 18. On the other hand, if the PHEV 24 knows that the grid will need additional electrical storage capacity during the next time that the PHEV 24 will be parked, the PHEV 24 may modify its operation so that it will be substantially discharged when it is parked. Thus, it will have the storage capacity needed by the grid 18. As described in more detail below, other considerations may also be used by the PHEV 24, which may include the economic benefit to the driver of meeting the needs of the grid 18, the expected needs of the driver during the next driving interval, and other considerations.

Figure 2:
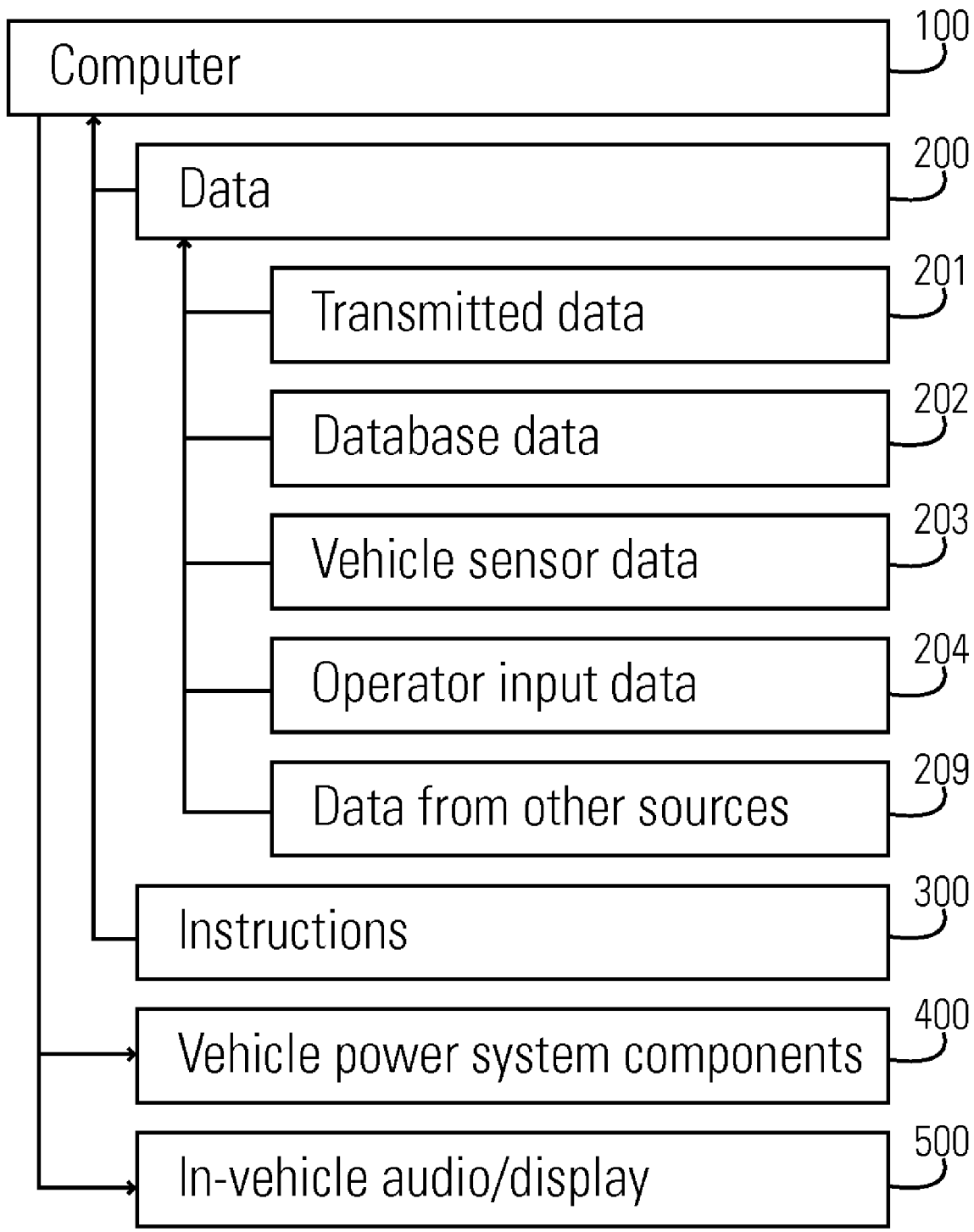
FIG. 2 is a schematic diagram of a computer system used with the V2G optimizing system in FIG. 1 showing some of the sources of data process by the computer system in accordance with an embodiment of the invention.

FIG. 2 shows an embodiment of a computer system used with the V2G optimizing system 10 in FIG. 1 showing some of the sources of data processed by the optimizing system 10 in accordance with an embodiment of the invention. In particular, the optimizing system 10 includes a computer 100 that receives as inputs data 200 and instructions 300. The data 200 may come from various sources, such as transmitted data 201, database data 202, vehicle sensor data 203, operator input data 204, and data from other sources 209. Transmitted data 201 may include data from the ISO received through communication signals 28. The other sources may comprise, for example, predictive data determined by analysis of past data. FIG. 2 also shows that outputs from the computer 100 may go directly to vehicle power system components 400 in the PHEV 24, or may be presented to the operator via an in-vehicle audio and/or visual display 500.

Figure 3:
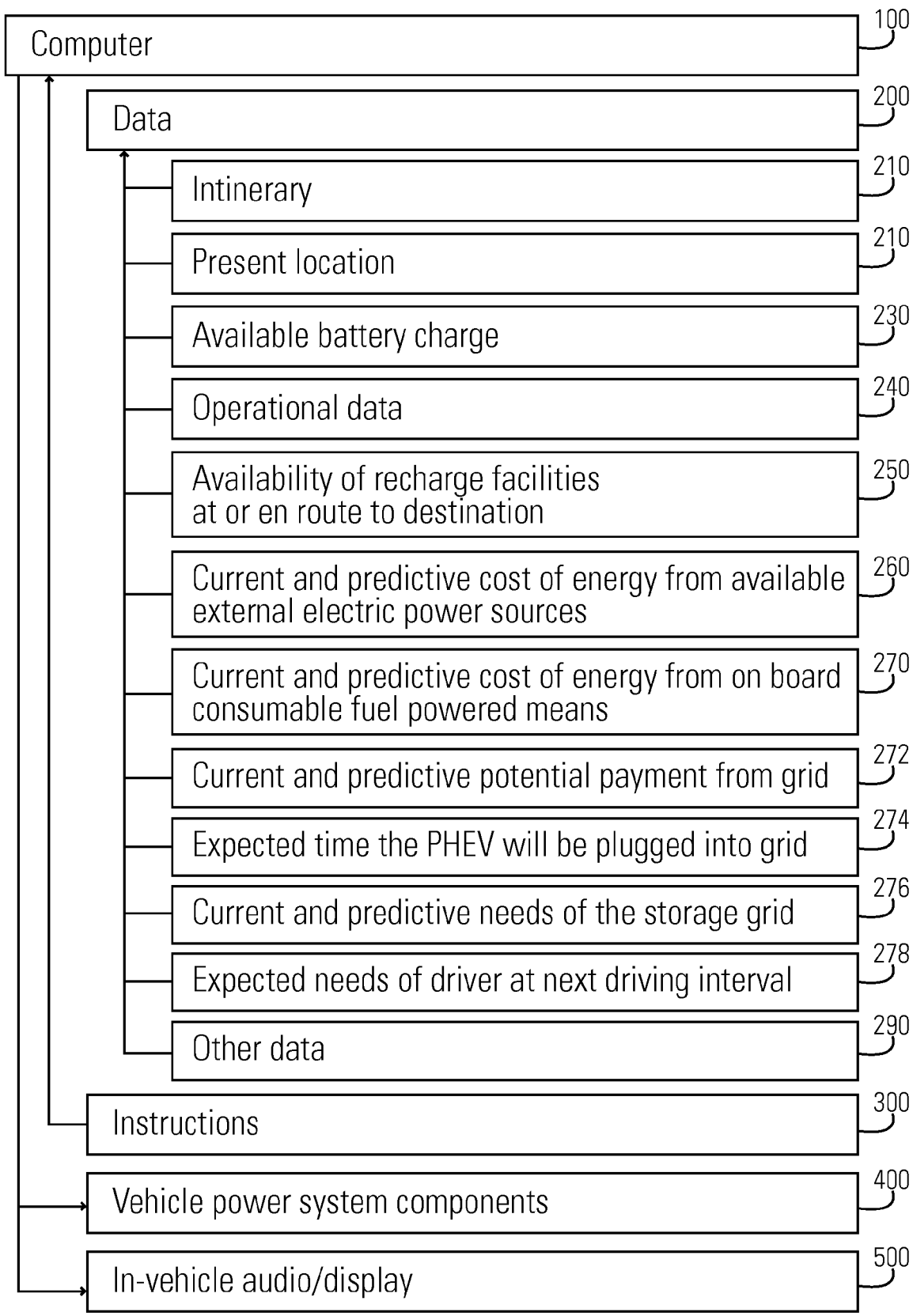
FIG. 3 is a schematic diagram of a computer system used with the V2G optimizing system in FIG. 1 showing the various kinds of information processed by the computer system in accordance with an embodiment of the invention.

Referring now to FIG. 3, there is shown an embodiment of a computer 100 receiving as inputs data 200 and instructions 300. The data 200 is described in terms of the type of information represented by the data, such as itinerary data 210, present location data 220, available battery charge 230, operational data 240, availability of recharge facilities at, or en route to, destination 250, current and predictive (at the time the vehicle will be attached to the grid 18 (Shown in FIG. 1) after the current trip) cost of energy from available external electric power sources 260, current and predictive (at the time the vehicle will be attached to the grid 18) cost of energy from onboard consumable fuel powered means 270, current and predictive potential payment from the grid 18 (or utilities) for use of the PHEV 272, current and predictive needs of the grid 18 for use of the PHEV 274, expected time the PHEV 24 will be plugged into the grid 276, expected needs of the driver at the next driving interval 278, and other data 290. The other data 290 may include any additional factors that could influence the optimizing system 10 to determine proposed routes and electric/gas trade-offs during the course of the trip.

Like FIG. 2, FIG. 3 shows that outputs from the computer 100 may go directly to PHEV 24 power system components 400 or may be presented to the operator via an in-vehicle audio and/or visual display 500. Regarding data category 274 (current and predictive needs of the grid 18), when the grid 18 needs the PHEV 24 vehicle for storage, the vehicle should have a drained or low-level of charge in the battery at the end of the trip; but when the grid needs the vehicle as a power source, the vehicle's battery should be at a high-level of charge at the end of the trip.

With regard to the data categories 276 (expected time the PHEV 24 will be plugged in) and 278 (expected needs of the driver at the next driving interval), this information can come from either direct input from the PHEV driver, as shown at 204, or by the optimizing system 10 (Shown in FIG. 1) learning driving patterns of the driver. For example, the optimizing system 10 can detect patterns such as "it's late evening, and the driver rarely uses the vehicle after 9:00 pm, so I can expect to be plugged into the grid for the next few hours until 7:00 am when the driver takes hisher usual trip to work". Factors such as time of day and day of week clearly will factor into this predictive portion of the optimizing system 10.

In comparing FIG. 2 and FIG. 3, it should be observed that there is not a one-to-one correspondence in the way data 200 is described in the two drawings. Different embodiments of the invention may get any of various types of information, as shown in FIG. 3, from any of various types of sources, as shown in FIG. 2. For example, the original and/or present location of PHEV 210 may be obtained from transmitted data 201, from operator input data 204, or from other sources. As another example, operational data 240 may be obtained from database data 202, from operator input data 204, or from other sources. As a further example, available battery charge 230 may be obtained from vehicle sensor data 203, from operator input data 204, or from other sources. Similarly, operational data 240 may be obtained from database data 202, from operator input data 204, or from other sources. Likewise, availability of recharge facilities at, or en route to, destination 250 may be obtained from transmitted data 201, from database data 202, from operator input data 204, or from other sources. Also, the cost of energy from available external electric power sources 260 may be obtained from transmitted data 201, from database data 202, from operator input data 204, or from other sources. As a final example, the cost of energy from onboard consumable fuel powered means 270 may be obtained from transmitted data 201, from database data 202, from operator input data 204, or from other sources. The foregoing examples are for the purpose of illustration and not limitation. It is possible that substantially all types of information (FIG. 3) could be provided by substantially all types of data sources (FIG. 2).

Figure 4:
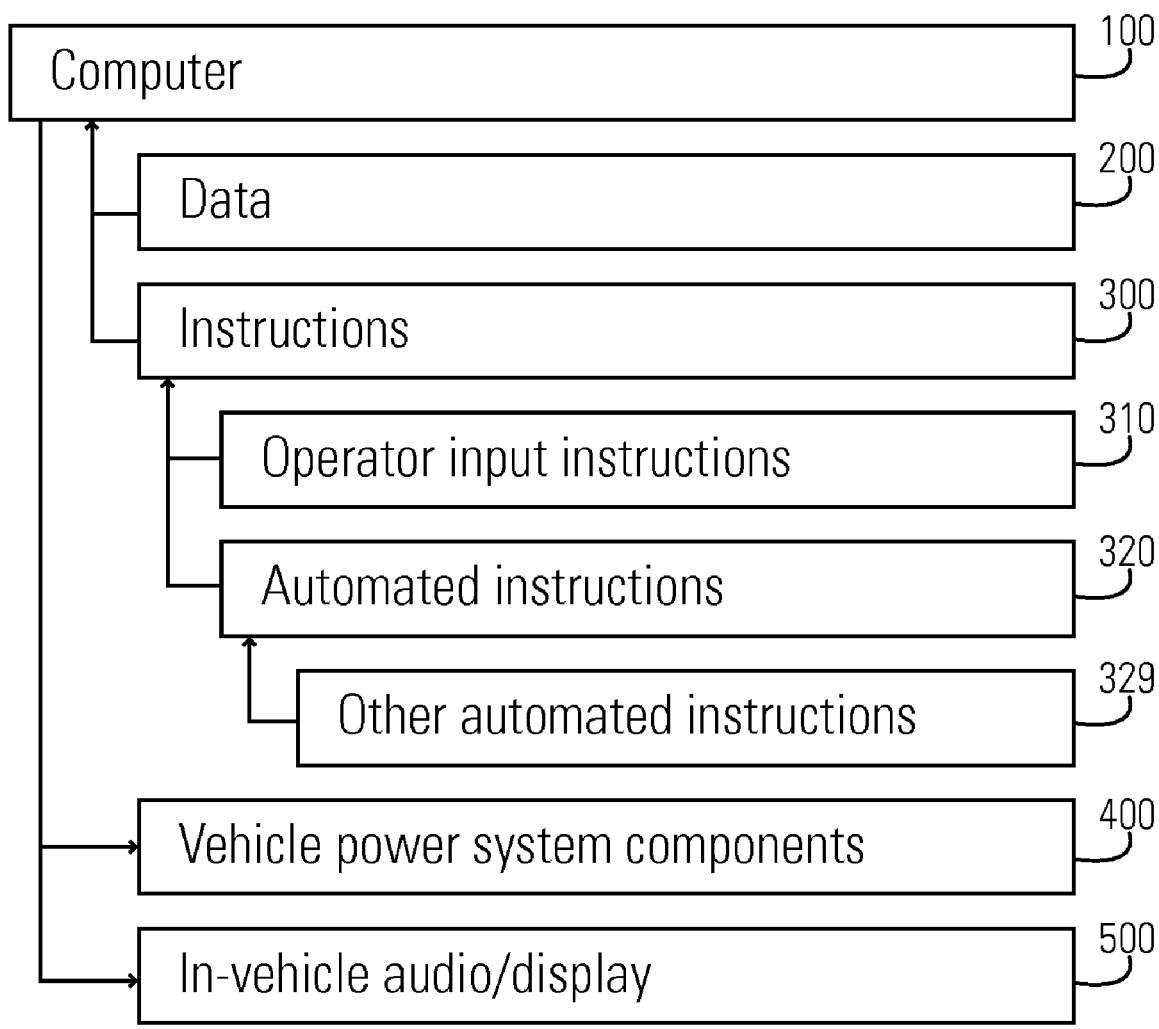
FIG. 4 is a schematic diagram of a computer system used with the V2G optimizing system in FIG. 1 showing the generation of instructions in accordance with an embodiment of the invention.

Referring now to FIG. 4, there is shown a computer 100 receiving as inputs data 200 and instructions 300. FIG. 4 also shows that outputs from the computer 100 may go directly to vehicle power system components 400 or may be presented to the operator via an in-vehicle audio and/or visual display 500. The instructions 300 may be either operator input instructions 310 or automated instructions 320, which are not restricted in type. Automated instructions may take the form of software, firmware, or any other form or combination of forms in which computer instructions may be automated. Automated instructions 320 may or may not be subject to reprogramming or other change. An automated instruction 320 would enable the computer 100 to determine, based on data 200 and potentially in conjunction other automated instructions 329, the optimal state of charge condition to leave the PHEV 24 when parked. Automated instructions may be created by a processor that is part of computer 100 or by an external instruction generator (not shown).

Figure 5:
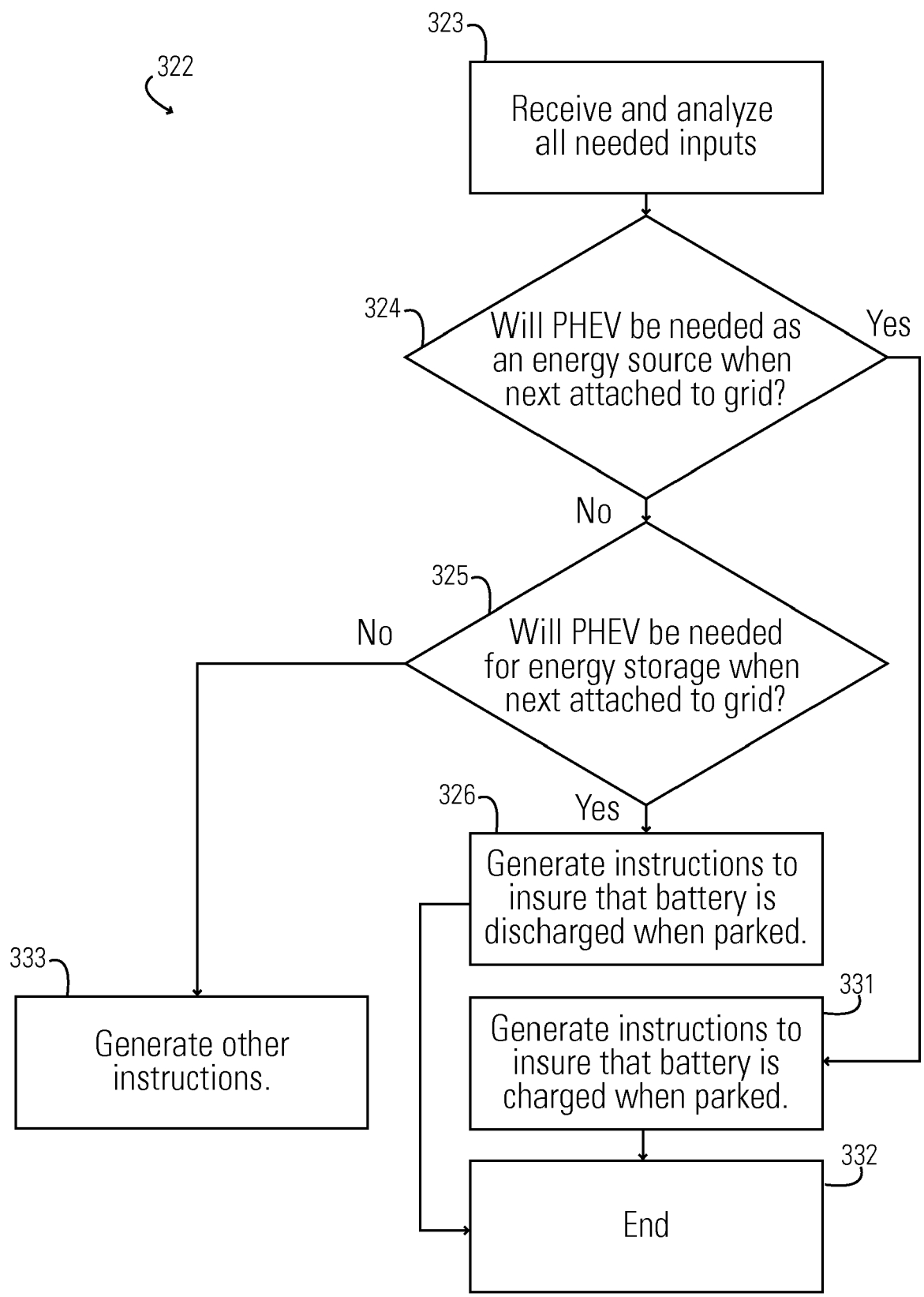
FIG. 5 shows a flow chart of a process for generating automated instructions shown in FIG. 4 in accordance with an embodiment of the invention.

An exemplary process 322 for determining an automated instruction 320 is shown in FIG. 5. First, computer 100, or an instruction generator (not shown) receives and analyzes all the needed input data 200 for the instruction, in step 323. Next, the process 322 determines if the PHEV 24 will be needed as an energy source when next attached to the grid 18, in step 324. The data needed to make this determination may include some or all of the data 210-290 shown in FIG. 3. If the answer is yes, step 331 will generate an instruction for the computer 100 (Shown in FIG. 2) to control the vehicle power components 400 (Shown in FIG. 3) such that the battery in the PHEV 24 (Shown in FIG. 1) will be substantially charged when is parked next.

Alternatively, if step 324 determines that the PHEV will not be needed as an energy source by the grid 18, then step 325 will determine if the PHEV will be needed for energy storage when it is expected to be parked next. If the answer is yes, then step 326 will generate an instruction to the computer 100 to control the vehicle power components 400 such that the battery in the PHEV 24 will be substantially discharged when it is expected to be parked. After steps 326 or 331 are performed the process 322 ends at step 332.

If the step 325 determination is no, then the process 322 will generate other instructions, in step 333. For example, an alternative analysis may be performed to reach other goals, besides meeting the needs of the grid 18. This may include operating the PHEV 24 using the combination of electric and convention on-board fuel that is most economical.

It will also be appreciated that process 322 may be modified to consider other factors. For instance, the needs of the grid 18 and the economic benefit of meeting the needs of the grid 18 may not be the only factor in determining whether the PHEV is charged or discharged when parked. These factors may be considered, but may be overridden by other considerations. For example, if the economic rewards of meeting the needs of the grid 18 are small compared to other considerations, the computer 100 may compute an optimal usage profile for the vehicle's electric and conventional fuel in order to minimize the energy cost of the trip without regard for the state of the batteries when the vehicle is parked.

In another scenario, it may be desirable to have the PHEV 24 parked with a charged battery to accommodate the needs of the grid 18 during the night. However, the PHEV 24 also may need to be charged the next morning when it will be driven again. In this situation, the computer 100 may allow the grid 18 to use the PHEV 24 as a source during the night hours, but may begin a recharging process in the early morning hours in order to restore the battery's charge by the time the PHEV 24 will be driven again.

In any event, the determination of the computer 100 could be output either directly to vehicle power system components 400 or to the in-vehicle audio and/or visual display, where it could be received by an operator who could then take appropriate action. Such operator action might include, but would not be limited to, an operator input instruction 310 (shown in FIG. 4) to cause the computer 100 to generate an output to, for example, determine optimal energy usage profile directly to the vehicle power system components 400.

It will be appreciated that the use of different data sources, as in FIG. 2, to provide different types of information, as in FIG. 3, may result in different embodiments of the invention. For example, origin and location data could be provided by operator input, by GPS transmission, or by other sources. Available battery charge data could be provided by operator input, by vehicle sensors, or by other sources. Operational data could be provided by operator input, by database, or by other sources. A database of operational data could be compiled automatically as data is collected in the ordinary course of operation of the invention; alternatively, such a database could be compiled from vehicle performance specification data or from other sources.

Data as to the availability of recharge facilities at, or en route to, the destination could be provided by transmission, by database, by operator input, or by other sources. Data as to the availability of recharge facilities at, or en route to, the destination could be provided as GPS data used in conjunction with a database of facility locations, or provided directly by recharging facilities transmitting such location data to notify drivers en route. Alternatively, if the computer 100 is located away from the vehicle and connected to the vehicle by wireless network or other means, notification of the availability of recharge facilities at, or en route to, the destination could be provided to the computer by other sources. Regardless of the data source by which such notification is provided, some embodiments of the invention would be capable of receiving data as to the availability of recharge facilities at, or en route to, the destination and adjusting the vehicle's optimization plan accordingly, which may include a determination of an optimum route as well as an optimum gas/electric power utilization. Such adjustments could be calculated on the fly, according to automated instructions, with notification to the operator of the location of the recharging facility and of the energy cost savings if a recharging stop were made and the calculated adjustment were implemented. The operator could then input an instruction to accept or reject the adjustment.

Data as to the cost of energy from available external electric power sources could be provided by communication signals 28, by database, by operator input, or by other sources. Regarding transmitted data as to the cost of energy from recharging facilities at, or en route to, the destination, such data could be provided directly by recharging facilities transmitting the data to notify drivers en route. Alternatively, if the computer is located away from the vehicle and connected to the vehicle by wireless network or other means, notification of the cost of energy from available external electric power sources at, or en route to, the destination could be provided by other sources. Regardless of the data source by which such notification is provided, some embodiments of the invention would be capable of receiving notification and adjusting the vehicle's refueling plan and the management of the consumption ratio between electric charge and consumable fuel so that consumption of consumable fuel may be optimized for cost-effectiveness, while balancing the needs of the grid 18 and the benefits of meeting those needs. Such adjustments could be calculated on the fly, according to automated instructions, with notification to the operator of the location of the recharging facility and of the energy cost savings if a recharging stop were made and the calculated change in management of the consumption ratio were implemented. The operator could then input an instruction to accept or reject the adjustment.

It may be noted that besides communication signals 28 and 30 described above, the optimization system 10 may employ various types of a communication medium and infrastructure, e.g., wireless or cell phone, in order for the PHEV 24 to communicate real-time with the grid 18 while driving. This communication may be used to gather the current and predictive information from the grid 18 about the expected requirements and benefits of the PHEV 24 in the V2G connection. In addition, this communication medium, or an alternative such as landline based network, could be used while the vehicle is connected to the grid to communicate any real-time and expected requirements of the driver and/or the grid.

Data as to the cost of energy from onboard consumable fuel powered means could be provided by database, by operator input, or by other sources. Other data determined to be useful in any embodiment of the invention could be provided, as appropriate, by transmission, by database, by vehicle sensor, by operator input, or by other sources. As noted above, some embodiments of the invention may locate the computer onboard the hybrid vehicle, while other embodiments may provide for the hybrid vehicle to be connected by wireless network or other means to a computer (including, but not limited to, a server) located somewhere else.

Some embodiments of the invention may locate data sources (including, but not limited to, storage devices or databases) onboard the hybrid vehicle, while other embodiments may provide for the hybrid vehicle to be connected by wireless network or other means to one or more data sources (including, but not limited to, storage devices or databases) located somewhere else.

It will be appreciated that in addition to an onboard generator, the PHEV 24 may also be equipped with a passive recharging system, such as a regenerative braking system. In such embodiments, the computer 100 may also consider the availability of recharging using such passive means when controlling the power system components 400. For example, if the PHEV 24 has regenerative braking, an important factor for the computer 100 may be the amount of stop-and-go driving versus non-stop highway travel, since these conditions will affect the amount of potential recharging using regenerative braking.

The invention can take the form of an entirely hardware embodiment, an entirely software embodiment, or an embodiment containing both hardware and software elements. In a preferred embodiment, the invention is implemented in software, which includes, but is not limited to, firmware, resident software, and microcode.

Furthermore, the invention can take the form of a computer program product accessible from a computer-usable or computer-readable medium providing program code for use by, or in connection with, a computer or any instruction execution system. For the purposes of this description, a computer-usable or computer-readable medium can be any apparatus that can contain, store, communicate, propagate, or transport the program for use by, or in connection with, the instruction execution system, apparatus, or device.

The medium can be an electronic, magnetic, optical, electromagnetic, infrared, semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, or an optical disk. Current examples of optical disks include compact disk-read-only memory (CD-ROM), compact disk-read/write (CD-RW), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

Figure 6:
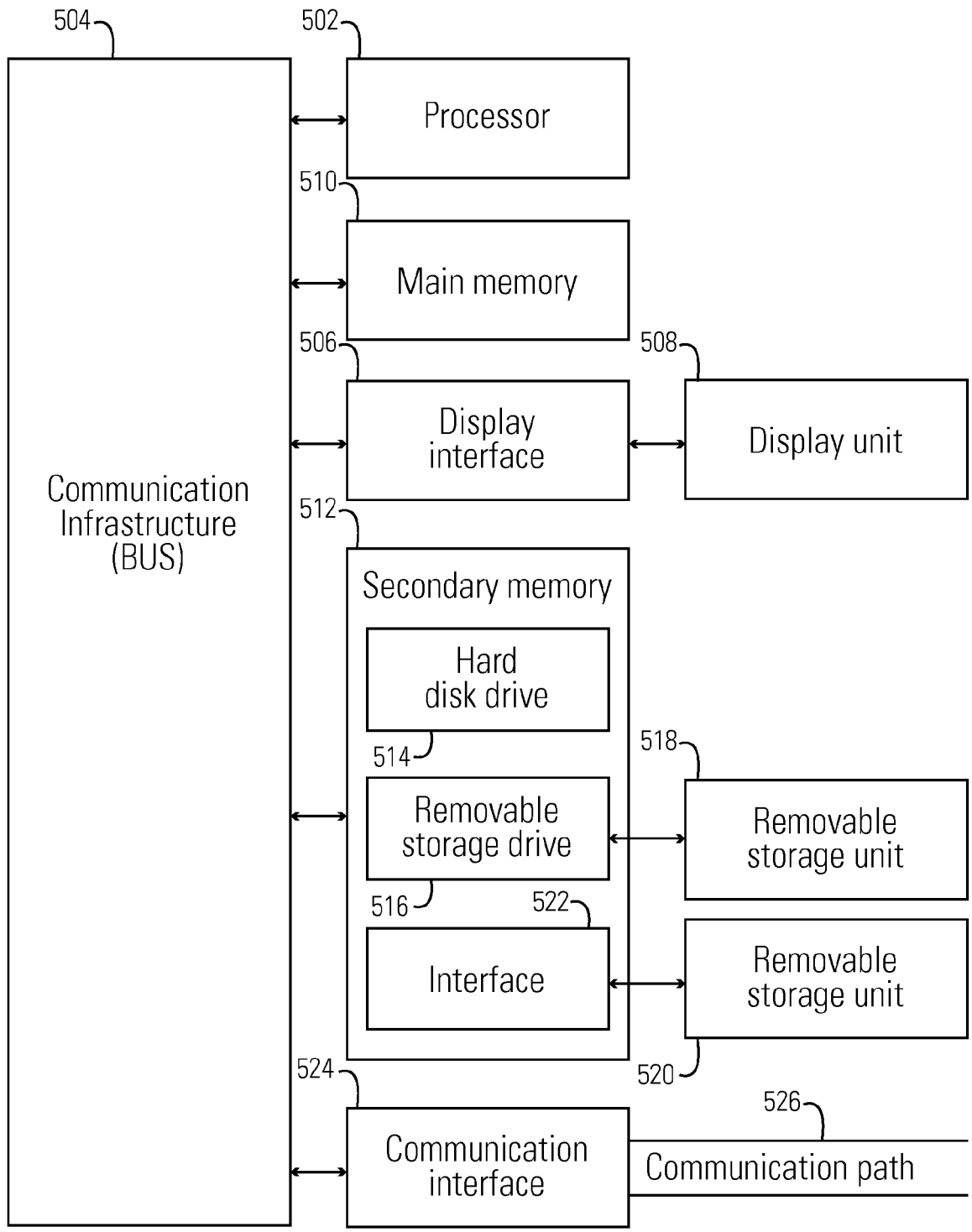
FIG. 6 shows a high level block diagram of an information processing system useful for implementing one embodiment of the present invention.

FIG. 6 is a high level block diagram showing an information processing system useful for implementing one embodiment of the present invention. The computer system includes one or more processors, such as processor 502. The processor 502 is connected to a communication infrastructure 504 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 506 that forwards graphics, text, and other data from the communication infrastructure 504 (or from a frame buffer not shown) for display on a display unit 508. The computer system also includes a main memory 510, preferably random access memory (RAM), and may also include a secondary memory 512. The secondary memory 512 may include, for example, a hard disk drive 514 and/or a removable storage drive 516, representing, for example, a floppy disk drive, a magnetic tape drive, or an optical disk drive. The removable storage drive 516 reads from and/or writes to a removable storage unit 518 in a manner well known to those having ordinary skill in the art. Removable storage unit 518 represents, for example, a floppy disk, a compact disc, a magnetic tape, flash memory card, or an optical disk, etc., which is read and written to by removable storage drive 516. As will be appreciated, the removable storage unit 518 includes a computer readable medium having stored therein computer software and/or data.

In alternative embodiments, the secondary memory 512 may include other similar means for allowing computer programs or other instructions to be loaded into the computer system. Such means may include, for example, a removable storage unit 520 and an interface 522. Examples of such means may include a program cartridge and cartridge interface (such as that found in video game devices), a removable memory chip (such as an EPROM, or PROM) and associated socket, and other removable storage units 520 and interfaces 522 which allow software and data to be transferred from the removable storage unit 520 to the computer system.

The computer system may also include a communications interface 524. Communications interface 524 allows software and data to be transferred between the computer system and external devices. Examples of communications interface 524 may include a modem, a network interface (such as an Ethernet card), a communications port, or a PCMCIA slot and card, etc. Software and data transferred via communications interface 524 are in the form of signals which may be, for example, electronic, electromagnetic, optical, or other signals capable of being received by communications interface 524. These signals are provided to communications interface 524 via a communications path (i.e., channel) 526. This channel 526 carries signals and may be implemented using wire or cable, fiber optics, a phone line, a cellular phone link, an RF link, wifi and/or other communications channels.

In this document, the terms "computer program medium," "computer usable medium," and "computer readable medium" are used to generally refer to media such as main memory 510 and secondary memory 512, removable storage drive 516, and a hard disk installed in hard disk drive 514.

Computer programs (also called computer control logic) are stored in main memory 510 and/or secondary memory 512. Computer programs may also be received via communications interface 524. Such computer programs, when executed, enable the computer system to perform the features of the present invention as discussed herein. In particular, the computer programs, when executed, enable the processor 502 to perform the features of the computer system. Accordingly, such computer programs represent controllers of the computer system.

From the above description, it can be seen that the present invention provides a system, computer program product, and method for optimizing a V2G system. When planning routes and gas/electric power utilization en-route, embodiments of the invention may take into consideration expected grid needs (storage or source), and the economic benefit to the driver for hisher contribution to the V2G system, as well as expected needs of the driver at the next driving interval. Economic benefit can be in monetary terms, or in other quantifiable metrics such as carbon footprint.

References in the claims to an element in the singular is not intended to mean "one and only" unless explicitly so stated, but rather "one or more." All structural and functional equivalents to the elements of the above-described exemplary embodiment that are currently known, or later come to be known, to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

While the preferred embodiments of the present invention have been described in detail, it will be understood that modifications and adaptations to the embodiments shown may occur to one of ordinary skill in the art without departing from the scope of the present invention as set forth in the following claims. Thus, the scope of this invention is to be construed according to the appended claims and not limited by the specific details disclosed in the exemplary embodiments.

We claim:

1. A vehicle, comprising:
  a consumable fuel powered engine;
  a battery;
  an electric motor powered by said battery, said battery being rechargeable both from an external power source and from said consumable fuel powered engine; and
  a computer receiving data and instructions as inputs and providing outputs, wherein: both of said receiving and said providing occurring while said vehicle is disconnected from said external power source, said data describing a condition of said external power source at a predetermined future time when said vehicle is expected to be coupled to said external power source, said instructions enabling said computer to determine an optimal state of electric charge of said battery at said predetermined future time, based on said condition, and said outputs include control signals to control the state of charge by charging and/or discharging said battery to reach said optimal state of electric charge at said predetermined future time.

2. The vehicle of claim 1, wherein said data inputs include data relating to the relative cost of energy from consumable fuel and an expected cost of energy from said external power source at said predetermined future time.

3. The vehicle of claim 1, further comprising:
  a communication system to permit transmission of said input data from said external power source to said vehicle, while said vehicle is disconnected from said external power source.

4. The vehicle of claim 1, wherein said data include predictive needs of said vehicle during a driving interval following said predetermined future time.

5. The vehicle of claim 1, wherein said input data include current and predictive payment from said external power source for use of said battery when coupled to said external power source.

6. A system for optimizing a vehicle's energy consumption, comprising:
  a computer coupled to a vehicle, the computer receiving data and instructions as inputs and providing outputs, wherein:
  the vehicle has a battery-powered electric motor and a consumable fuel powered means, a battery powering said electric motor being rechargeable from an external power source and from said consumable fuel powered means, both of said receiving and providing occurring while said vehicle is disconnected from said external power source;
  said data describing a condition of said external power source at a predetermined future time when said vehicle is expected to be coupled to said electric power source, said instructions enabling said computer to determine an optimal state of electric charge of said battery at said predetermined future time, based on said condition, and said outputs include signals controlling whether said battery is charged and/or discharged to reach said optimal state of electric charge at said predetermined future time.

7. The system of claim 6, further comprising:
vehicle power system components controlled by said computer, wherein said computer controls said vehicle power system components to control recharging of said battery such that said battery is charged at said predetermined future time in a case when said condition of said electric power source is one where additional power producing capacity is needed.

8. The system of claim 6, further comprising:
vehicle power system components controlled by said computer, wherein said computer controls said vehicle power system components to control recharging of said battery such that said battery is discharged at said predetermined future time in a case where said condition of said electric power source is one where additional power storage is needed.

9. The system of claim 6, wherein said data include current and predictive needs of said electric power source.

10. The system of claim 6, wherein said data include current and predictive cost of energy available from said electric power source.

11. The system of claim 6, wherein said instructions are automated instructions.

12. The vehicle of claim 1, wherein said computer is receiving said data as inputs and providing outputs while said vehicle is in use for transportation.

13. The vehicle of claim 1, wherein said computer determines an expected condition of an electric power grid at said predetermined future time.

14. The vehicle of claim 1, wherein said determining comprises determining whether said expected condition indicates that said vehicle will be needed as a power source at said predetermined future time.

15. The vehicle of claim 1, wherein said determining comprises determining whether said expected condition indicates that said vehicle will be needed for energy storage at said predetermined future time.

16. The vehicle of claim 13, wherein said controlling comprises controlling said charging and discharging of said battery such that said battery is in a charged state when coupled to said electric power grid.

17. The vehicle of claim 13, wherein said controlling comprises controlling said charging and discharging of said battery such that said battery is in a discharged state when coupled to said electric power grid.

18. The vehicle of claim 1, wherein said data are selected from the group consisting of: an itinerary of said vehicle, operational data, available battery charge, availability and cost of energy from external electric power sources, availability and cost of consumable fuel for said consumable fuel powered engine, and current and predictive cost of energy from consumable fuel for said consumable fuel powered engine.

* * * * *